Sept. 18, 1962 W. R. SMITH ETAL 3,054,214
COMBINED TOY SAWMILL AND LUMBER LOADING STATION
Filed March 20, 1958 5 Sheets-Sheet 1

INVENTORS
William R. Smith
Gabriel R. Monaco
BY
ATTORNEY

Sept. 18, 1962  W. R. SMITH ETAL  3,054,214
COMBINED TOY SAWMILL AND LUMBER LOADING STATION
Filed March 20, 1958  5 Sheets-Sheet 2

INVENTORS
William R. Smith
Gabriel R. Monaco
BY
ATTORNEY

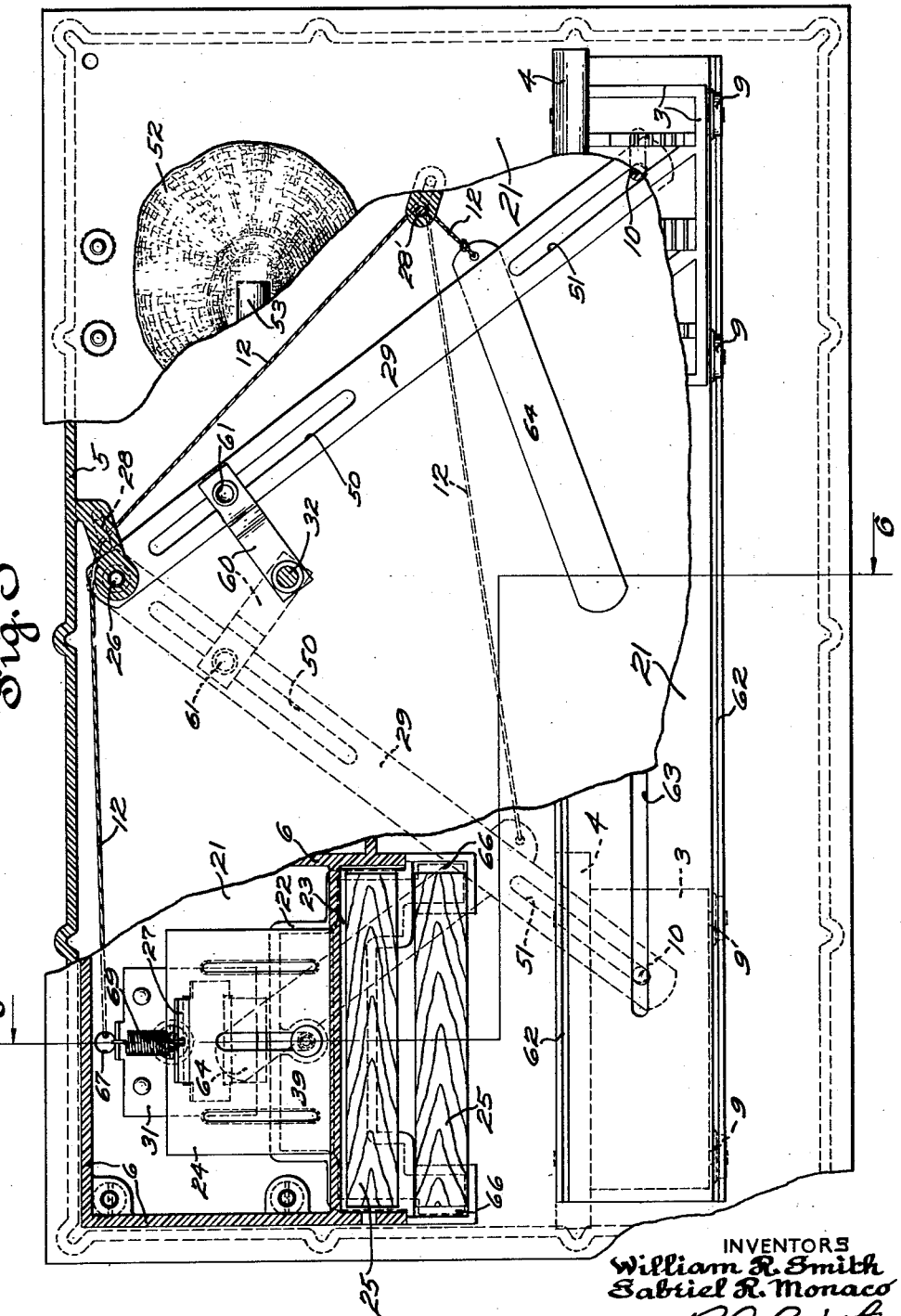

Sept. 18, 1962  W. R. SMITH ETAL  3,054,214
COMBINED TOY SAWMILL AND LUMBER LOADING STATION
Filed March 20, 1958  5 Sheets-Sheet 4
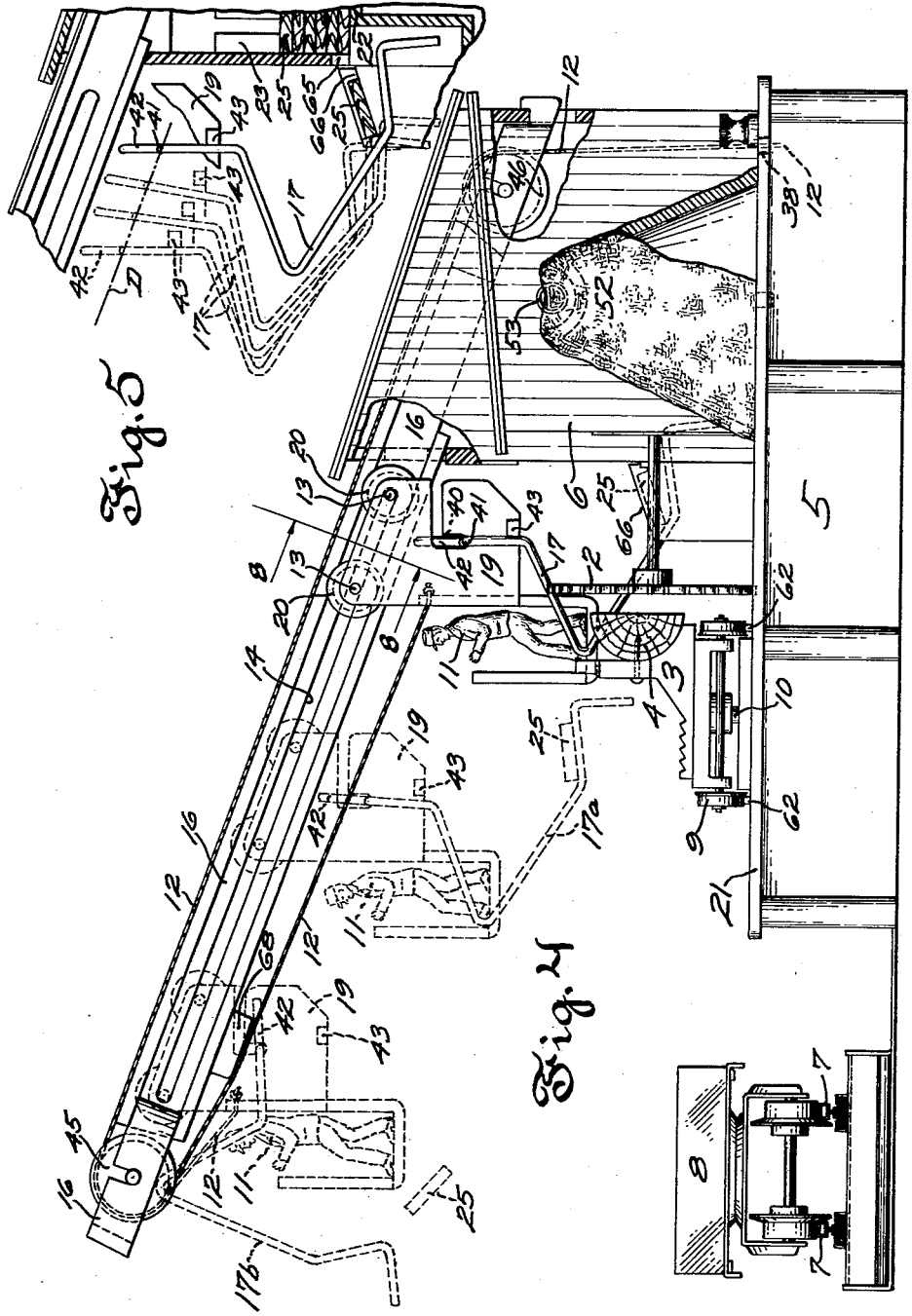
INVENTORS
William R. Smith
Gabriel R. Monaco
BY
ATTORNEY INVENTORS
William R. Smith
Gabriel R. Monaco
BY
ATTORNEY

United States Patent Office 3,054,214
Patented Sept. 18, 1962

3,054,214
COMBINED TOY SAWMILL AND LUMBER LOADING STATION
William R. Smith, Hamden, and Gabriel R. Monaco, New Haven, Conn., assignors to The A. C. Gilbert Company, New Haven, Conn., a corporation of Maryland
Filed Mar. 20, 1958, Ser. No. 722,697
6 Claims. (Cl. 46—39)

This invention relates to an animated toy adapted particularly for use as a trackside station in a toy railway system whereby there is simulated automatically the operation of sawing logs into lumber boards followed by the loading of the "sawed-off" boards one by one onto a gondola or other suitable type of freight car of the toy railroad.

An object of the invention is to coordinate the pseudo log sawing travel of a log conveying carriage past a buzz saw with the car loading action of a crane trolley and in such synchronism that each excursion of the log carriage past the saw is followed by the pick up of a single lumber board by the crane trolley under such conditions that the board so picked up appears to have been sawed off from the log. The board is then conveyed along a projecting boom to the free end thereof where the conveyed board is dropped automatically from the trolley onto a waiting toy freight car.

A related object is to increase the realism of action of the toy by causing each toy lumber board to be automatically delivered at a point that is concealed by the log conveying carriage at the time of delivery of the board so that the board seems to have been sawed off from the log when the log traveled past the buzz saw.

A further object is to store a supply of the toy lumber boards in a concealed location and to feed them one by one to the point at which they are to be picked up by the crane trolley.

A further object is to power all motion transmitting mechanism of the toy that serves to impel the log carriage, the crane trolley, the buzz saw and the board ejecting mechanism, from a single electric motor which together with the motion transmitting mechanism is concealed within the hollow of a housing and base structure. Preferably the housing structure may be fashioned to represent the work shed of a saw mill.

The foregoing and other objects of the invention will appear in greater particulars from the following description of a successful form of the toy having reference to the accompanying drawings wherein:

FIG. 3 is a view looking toward the left at the saw mill and loading station of FIG. 1 showing in broken lines successive positions of the crane trolley in its car loading excursion along the boom.

FIG. 4 indicates a succession of positions of the lumber board conveying hooks of FIG. 3 and their action in moving into position to engage and pick up a lumber board.

Figure 2:
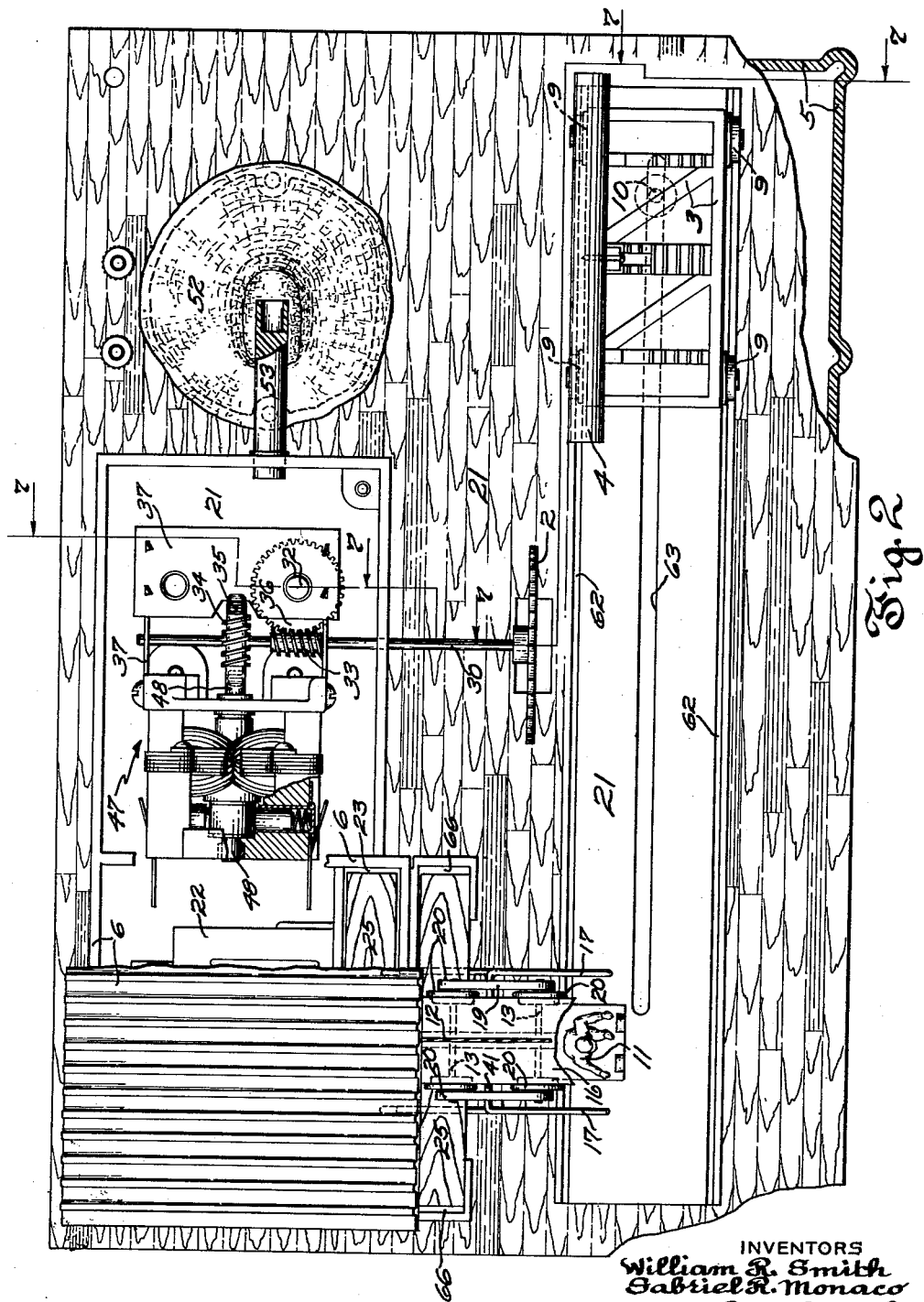
FIG. 2 is a plan view of the toy with the log carriage located at the right extremity of its path of shuttling travel, the roof of the shed housing being partially removed to expose underlying mechanism which animates the toy, a projecting portion of the crane boom being omitted.

FIG. 5 is a plan view like FIG. 2 showing the station flooring partly broken away to expose underlying motion transmitting mechanism by which the toy is animated.

Figure 6:
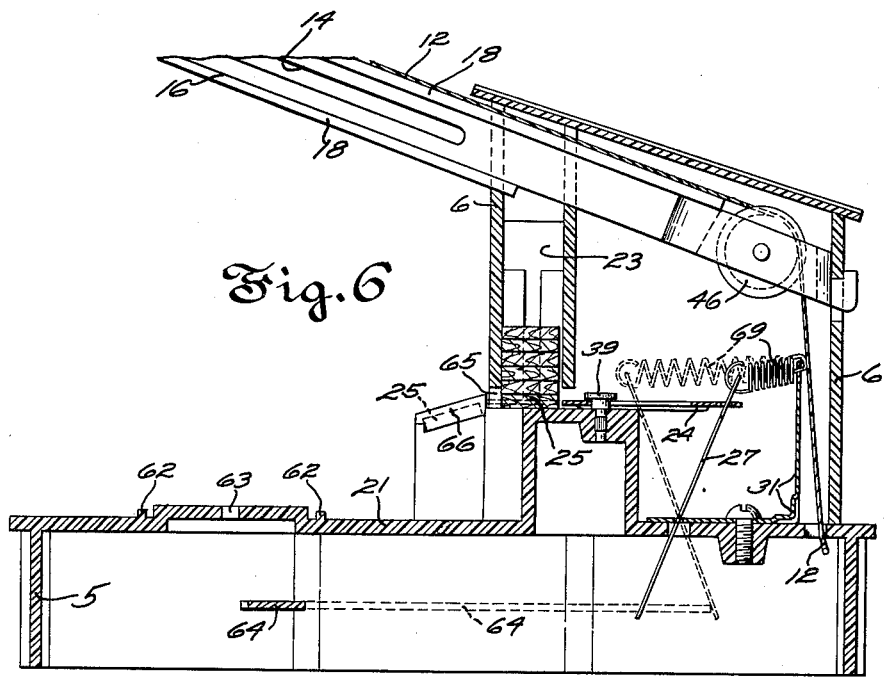

FIG. 6 is a view taken in section on the plane 6—6 in FIG. 3 looking in the direction of the arrows.

Figure 7:
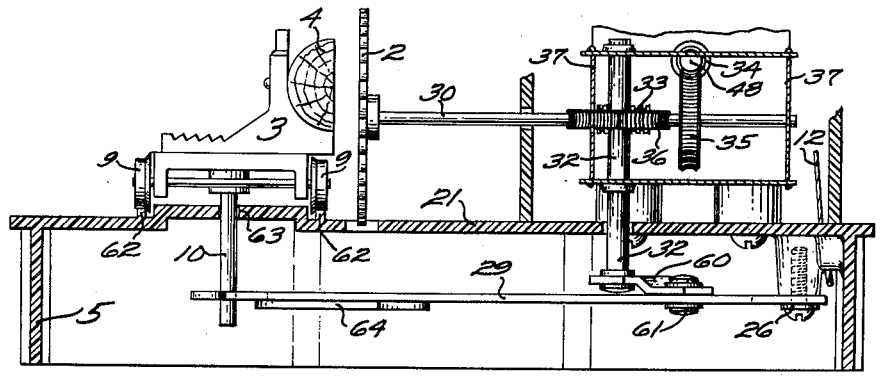

FIG. 7 is a section taken on the planes 7—7—7 in FIG. 2 looking in the direction of the arrows.

Figure 8:
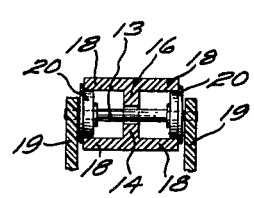

FIG. 8 is a view taken in section on the plane 8—8 in FIG. 4, looking in the direction of the arrows.

An animated toy incorporating these improvements may have a hollow base 5 conveniently molded from hard plastic and topped by a hollow superstructure fashioned to simulate a shed-like housing 6 from which there projects into offset or outboard relation to base 5 an inclined crane boom 16. The free end of boom 16 overhangs a toy railroad track 7 on which there may stand a toy freight car 8 preferably of the flat car or gondola type suitable for carrying piled toy lumber boards 25.

Such boards are shown in FIGS. 4 and 6 to be stacked loosely in a concealed position within a vertical magazine compartment 23 in shed housing 5 so that they rest loosely on a platform 22 elevated above the base flooring 21. Platform 22 is overlapped by a horizontally slidable ejector plate 24 which on occasion is impelled forward edgewise in FIG. 6, or from right to left in FIG. 6, so as to engage and shove the bottom board 25 of the stack in magazine 23 outward through a horizontally elongate outlet slot 65 in the upright wall of shed 6 and onto support ledges 66 that flank the ends of slot 65 just outside the shed. Boards 25 are thus ejected through slot 65 one at a time and come to rest with only the ends of the board supported on ledges 66. The ejector is powered to act as described by a prime mover or electric motor 47 through the medium of motion transmitting mechanism hereinafter to be described.

Figure 1:
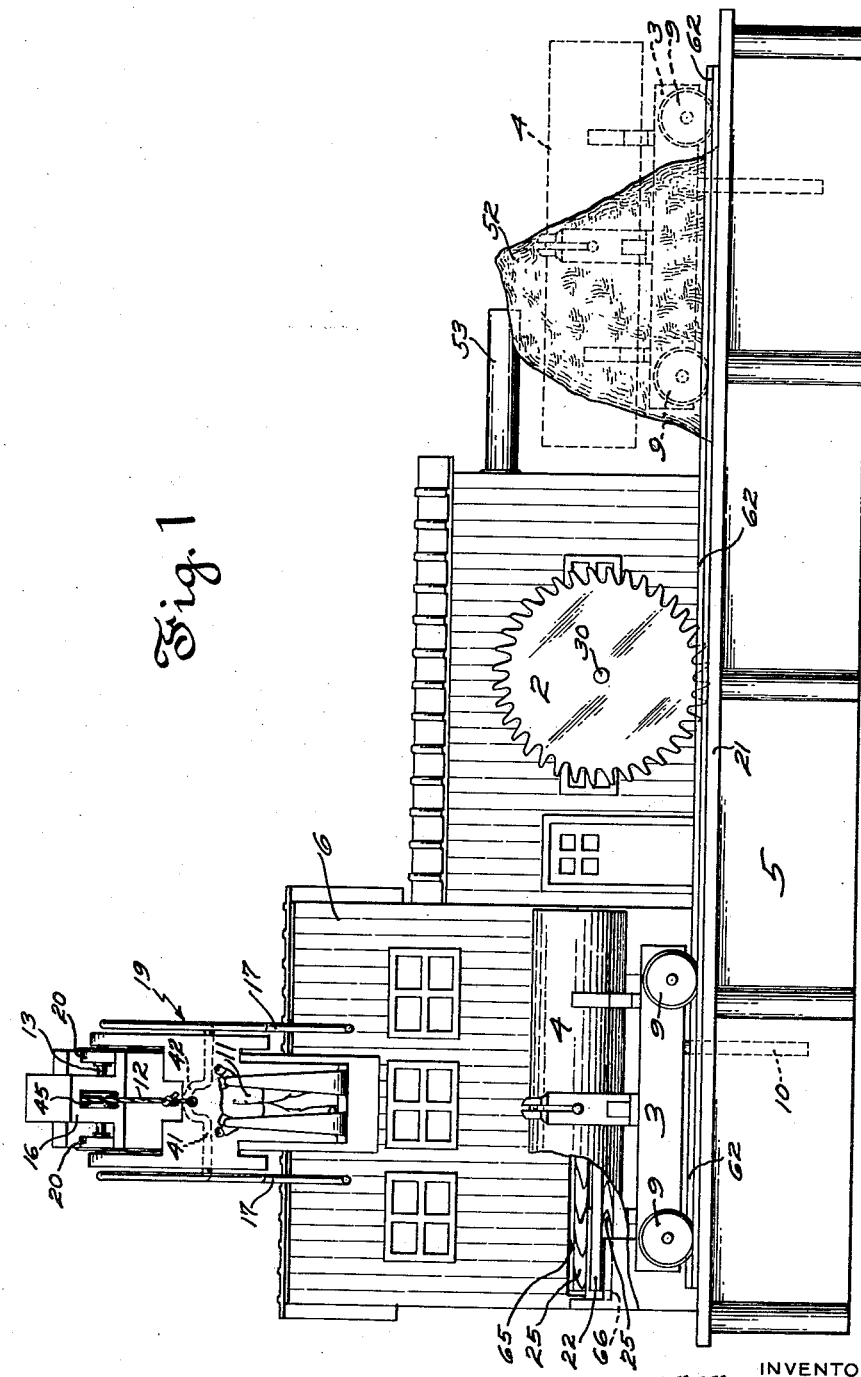
FIG. 1 is a front elevation of the complete animated saw mill and car loading station incorporating the invention, showing the log conveying carriage at the left extremity of its path of shuttling travel and partly broken away to expose the concealed delivery point of the "sawed off" lumber boards where they are picked up by the crane trolley.

In FIG. 1 the outlet slot 65 is concealed by a toy half-log 4 fixedly mounted on a log carriage 3 whose wheels 9 ride on a short stretch of rails 62 extending lengthwise of the base 5 which determine a course of travel for the log at the rear of which magazine 23 upstands from the flooring 21. In the flooring 21 of base 5 there is an elongate slot 63 between and parallel with rails 62 to accommodate travel therealong of an impellable vertical stud 10 fixed on and depending from log carriage 3. By means of stud 10, carriage 3 is impelled under the power of the aforesaid motor 47 to shuttle back and forth between its positions shown respectively in FIGS. 1 and 2 by means of motion transmitting mechanism hereinafter to be described.

A crane trolley 19 performs excursions along the boom 16 riding on overhead truck wheels 20 which roll on tracks 18 between top and bottom laterally extending flanges on the boom 16 which latter is H-shaped in cross section and whose vertical web wall contains the lengthwise extending slot 14 through which the axles 13 of wheels 20 extend with clearance. The car body of trolley 19 is thus prevented from swinging as it rides upward and downward along boom 16 and for realism there is carried as part of the body of the trolley a figurette 11 fashioned to represent a workman in operative control of the crane.

Swingably nested in a bearing notch 40 of a bayonet shape in the side walls of crane trolley 19 is the cross bail 41 of hook arms 17 that are formed by a continuous length of bent stiff wire. A middle portion of bail 41 loops upward at 42 to form a trippable extension that encounters a stationary stop lug 68 fixedly depending from boom 16 toward the end of the excursion of trolley 19 up the incline of the boom, thereby to cause hook arms 17 to swing to a position 17b for discharging the board 25. Each board will therefore fall into the car 8 upon reaching its highest point of travel along the boom. The normal position of hook arms 17 relative to the trolley is determined by a stop lug 43 on the car of the trolley into abutment with which the arms 17 are swung by gravity.

Travel of trolley 19 upward of the incline of boom 16 is caused by the pull of a flexible cord or cable 12 anchored to the trolley and trained about freely rotatable pulleys 45 and 46, such pull being exerted by the power of the aforesaid motor 47 through motion transmitting mechanism next to be described.

The motion transmitting mechanism is best shown in FIGS. 2, 5, 6 and 7 wherein the electric motor 47 is shown to be mounted on the flooring 21 of base 5 within the hollow of shed housing 6 so that the horizontal motor shaft 48 having worm threads 34 lies above and in gearing mesh with a speed reduction worm wheel 35 in the gear box 37. Worm wheel 35 is carried on a horizontal shaft 30 which has rotary bearings in side walls of the gear box and projects forwardly as shown in FIGS. 2, 3 and 7 to carry and rotate at its front end an imitation buzz saw 2 in a position closely flanked by the rear flat face of the half-log 4 as the latter is conveyed past saw 2 by the carriage 3.

Saw shaft 30 carries worm threads 33 within the gear box which mesh with another speed reducing driven worm wheel 36 fixed on the vertical shaft 32 which has rotary bearings in the top and bottom walls of the gear box and extends downward through a clearance aperture 38 in flooring 21 as shown in FIG. 7. Thrust collars on shaft 32 sustain its vertical position.

At its bottom end, shaft 32 fixedly carries the crank arm 60 whose wrist pin 61 slides freely in a slot 50 in the swingable actuator arm 29 which is pivotably anchored on the base 5 at 26. A terminal slot 51 near the free end of actuator arm 29 engages and impels the carriage carried stud 10 as the arm swings between its full line and broken line positions in FIG. 15.

Swingable actuator arm 29 further carries in fixed relation thereto an actuating pusher 64 whose free end travels in an arc in unison with the swinging of arm 29 and thus is brought at appropriate times in the operating cycle into actuating engagement with the depending end of a rocker lever 27 that is pivotedly mounted on a stationary angle fixture 31 secured on the base flooring 21. Rocker lever 27 extends downward through a clearance aperture in the flooring 21 and its upper end operatively engages a board ejecting slide plate 24 that is guided for rectilinear horizontal movement by headed stud 39 upstanding from platform 22 and which occupies a guide slot in the ejector plate 24. When rocker lever 27 swings counterclockwise in FIG. 6 its upper end pushes slide plate 24 forward so that the front edge of the latter encounters the rear edge of bottom board 25 of the stack of boards in compartment 33 and shoves the board forward through slot 65 in the wall of housing 6 into resting position on the ledges 66 aforesaid.

Tied to actuator arm 29 at a hole in the pusher 64 there is a flexible cable 12 which passes through two guide eyes 28 and 28' and then upward through a smoothly bushed aperture 67 in the flooring 21. The cable is then trained about the aforesaid lower pulley 46 and looped about upper pulley 45 whence it extends backward to be tied to the trolley 19.

By means of the operating connections which have now been described swinging of the actuator arm 29 causes the following sequence of animation of the movable parts of the toy and in such timing relation that operations of a real trackside saw mill and car loading station are realistically simulated as follows.

For realism there may be added in upstanding position on the flooring 21 a hollow form 52 of shape, color and surface texture to represent a pile of sawdust assumed to have been discharged from the saw mill through the exhaust pipe 53.

In operation, the running of the power motor 47 can be started and stopped by any conveniently located electric switch (not shown). While the motor runs the crank 60 continually revolves clockwise in FIG. 3 and its wrist pin 61 slides in the slot 50 of actuator arm 29 and thus swings arm 29 slowly back and forth between its full line position and its broken line position in FIG. 3. In such full line position of arm 29 the trolley 19 is at rest in its lowest position shown in full lines in FIGS. 2 and 4; the log and its carriage 3 are stationed in their full line position shown in FIGS. 2 and 3 (broken line position in FIG. 1); the board ejecting plate 24 is held yieldably retracted toward the rear of the housing 6 by means of the spring 69; and meanwhile the buzz saw 2 is rapidly rotating in readiness to "saw off" a board from the log 4. One such board 25 then rests in position to be picked up on the ledges 66 as shown in FIGS. 1, 2 and 3 and in broken lines in FIGS. 4 and 6.

As actuator arm 29 begins its clockwise swing from its full line position in FIG. 3 toward its broken line position, the log carriage 3 starts its movement toward the left from its position shown in FIG. 2. Simultaneously the trolley 19 starts to climb the incline of boom 16 with its hook-arms 17 carrying one of the boards 25 which it will have lifted from the ledges 66 as the trolley starts its climb along the boom in the direction of travel (D). The ledges 66 are now left empty as the log 4 performs its travel toward the left past the saw 2 and comes to rest in a place indicated by its full line position shown in FIG. 1 in front of, and concealing, the horizontal outlet slot 65 in the front wall of housing 6 which slot is at the level of the log. Just prior to the stopping of log carriage 3 in its travel toward the left the leading end of the actuating pusher 64 will engage and thrust rearward on the lower end of rocker lever 27 thus to swing this lever counterclockwise from its full line position to its broken line position in FIG. 6 against the retractive pull of spring 69. This action takes place rather abruptly and forces the slide plate 24 edgewise in a forward direction so that the bottom board 65 is shoved out of the magazine 33 onto the ledges 66 before the log carriage 3 starts its return travel from left to right in FIG. 1.

In the meantime trolley 19 has completed its travel upward along the boom until the upstanding tripping extension 42 of the arm hooks 17 encounters the tripping lug 68 that depends from the boom. This causes the arm hooks to swing to their broken line position 17b in FIG. 4 as the trolley completes its final increment of upward travel which causes the carried lumber board 25 to be dropped into the freight car 8.

As actuator arm 29 reverses its swinging travel to a counterclockwise direction in FIG. 3, the board ejecting plate 24 is withdrawn to the rear by spring 69 and the stack of boards 29 in magazine 23 is thus permitted to drop into a position directly resting on the bare top surface of platform 22 thus to bring the bottom board into edgewise alignment with the housing slot 65. The log carriage 3 continues to travel along its rails 62 back to its full line position in FIG. 2 as the cable 12 is payed out toward the upper end of the boom which permits the trolley 19 to coast backward down the incline of the boom with its hook arms 17 empty of the board that had previously been conveyed up the incline.

We claim:

1. In an animated toy saw mill including a toy circular saw and a simulated toy log supported on a carriage adapted to convey said log in a course of travel past said saw repeatedly from one to the other side thereof and back again, the combination with said saw and said log and carriage of, a magazine upstanding at the rear of said course of log travel adjacent to said saw at said other side thereof adapted to contain and conceal a stack of toy lumber boards, said magazine having a forwardly opening outlet for lumber boards to be successively ejected from said magazine therethrough, said outlet being located at the rear of said course of log travel in position to be substantially obscured from view by said log at one place in the latter's said course of travel, mechanism operative to cause successive ejections of individual boards from said stack through said opening, a prime mover, and motion transmitting means powered by said prime mover and connected to activate said saw carriage and said board ejecting mechanism in such synchronism that a board is ejected through said opening each time said opening is obscured from view by the presence of said log at said place, whereby each departure of said log from said place reveals a lumber board that has newly arrived behind said log and hence seemingly has been sawed therefrom.

2. In an animated toy saw mill as defined in claim 1, the combination recited in said claim, together with a repository located to receive a lumber board ejected from the said stack through the said outlet, a toy crane for automatically transferring the said lumber board from the said repository to a delivery station some distance therefrom, comprising a crane track, a trolley supported by said crane track powered by the said prime mover to perform an excursion therealong away from and back to said repository, and a pick-up claw suspended from said trolley in position to enter into pick-up engagement with said board.

3. In an animated toy saw mill as defined in claim 2, the combination recited in said claim, together with motion transmitting mechanism connecting the said trolley and the said log conveying carriage to the said prime mover to operate said trolley and said carriage in such synchronism that the said claw is brought into engagement with the said lumber board only when said log is absent from its said board obscuring place in its said course of travel.

4. In an animated toy saw mill as defined in claim 2, the combination recited in said claim, in which the said repository is constructed to support one of the said toy lumber boards in a manner to provide working room therebeneath, and the said pick-up claw is supported by the said trolley so as to travel in a path to enter and occupy said working room beneath said supported board preliminary to picking up and removing the latter from the repository.

5. In an animated toy saw mill as defined in claim 4, the combination recited in said claim, in which the said repository comprises ledges spaced apart a distance to support simultaneously and respectively only the end portions of a toy lumberboard spanning the said working room that is entered by the said pick-up claw.

6. In an animated toy saw mill as defined in claim 4, the combination recited in said claim, in which the said pick-up claw is pivotally suspended from the said trolley in a manner to cam yieldably against a lumber board supported by the said repository when entering the said working room beneath said board, whereby said claw can pass said board on entering said working room and pick up and carry away said board when leaving said working room.

References Cited in the file of this patent
UNITED STATES PATENTS

| | | |
|---|---|---|
| 673,587 | Steward | May 7, 1901 |
| 1,429,382 | Vaughan | Sept. 19, 1922 |
| 1,589,432 | Sapp | June 22, 1926 |
| 1,650,971 | Young | Nov. 29, 1927 |
| 1,748,542 | Demers | Feb. 25, 1930 |
| 2,265,710 | Wooten | Dec. 9, 1941 |
| 2,643,761 | Wagner et al. | June 30, 1953 |
| 2,776,522 | Schramm et al. | Jan. 8, 1957 |
| 2,810,975 | Goehring | Oct. 29, 1957 |
| 2,914,885 | Milligan | Dec. 1, 1959 |
| 2,922,249 | Zion | Jan. 26, 1960 |